US012592593B2

(12) United States Patent
Magnenet et al.

(10) Patent No.: US 12,592,593 B2
(45) Date of Patent: Mar. 31, 2026

(54) ROTOR, METHOD FOR MANUFACTURING A ROTOR, AND ELECTRIC MACHINE

(71) Applicant: Schaeffler Technologies AG & Co. KG, Herzogenaurach (DE)

(72) Inventors: Amelie Magnenet, Herrlisheim (FR); Maximilian Nekola, Ludwigsburg (DE); Dominik Knopp, Frankfurt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 236 days.

(21) Appl. No.: 18/700,984

(22) PCT Filed: Sep. 27, 2022

(86) PCT No.: PCT/DE2022/100713
§ 371 (c)(1),
(2) Date: Apr. 12, 2024

(87) PCT Pub. No.: WO2023/061525
PCT Pub. Date: Apr. 20, 2023

(65) Prior Publication Data
US 2024/0413681 A1 Dec. 12, 2024

(30) Foreign Application Priority Data
Oct. 15, 2021 (DE) .......................... 102021126750.1

(51) Int. Cl.
*H02K 1/276* (2022.01)
*H02K 1/28* (2006.01)
(Continued)

(52) U.S. Cl.
CPC .............. *H02K 1/276* (2013.01); *H02K 1/28* (2013.01); *H02K 15/03* (2013.01); *H02K 15/12* (2013.01)

(58) Field of Classification Search
CPC .......... H02K 1/276; H02K 1/28; H02K 15/03; H02K 15/12; H02K 21/14; H02K 2213/03; B60Y 2200/91; B60Y 2200/92
See application file for complete search history.

(56) References Cited

U.S. PATENT DOCUMENTS

| | | | | |
|---|---|---|---|---|
| 2016/0380493 A1* | 12/2016 | Matsumoto | .......... | H02K 1/2766 |
| | | | | 310/156.21 |
| 2017/0117781 A1* | 4/2017 | Yoshida | ................. | H02K 15/03 |

FOREIGN PATENT DOCUMENTS

| | | | | |
|---|---|---|---|---|
| DE | 102009043224 A1 * | 3/2011 | ............. | H02K 1/276 |
| DE | 102010010434 A1 | 9/2011 | | |

(Continued)

OTHER PUBLICATIONS

DE-102009043224-A1_translate (Year: 2011).*
(Continued)

*Primary Examiner* — Tulsidas C Patel
*Assistant Examiner* — Mohammed Ahmed Qureshi
(74) *Attorney, Agent, or Firm* — Suiter Swantz IP

(57) ABSTRACT

The invention relates to a rotor (1) for an electric machine (2), said rotor comprising a cylindrical rotor body (4) formed from a laminated rotor core (3) and having a plurality of pockets (5) for receiving rotor magnets (6), at least a first group (7) of pockets (5) extending in a substantially tangential direction, and the rotor magnets (6) being fixed in the pockets (5) of the first group (7) by an injected plastic (8), the pockets (5) of the first group (7) having a radially outer contour (9) which substantially corresponds to the radially outer arcuate contour of the cylindrical rotor body (4) in each case radially above the pockets (5) of the first group (7), plastic (8) being provided in each case between the radially outer contour (9) of one of the pockets (5) of the first group (7) and the rotor magnet (6) fixed in the pocket (5).

20 Claims, 4 Drawing Sheets

(51) Int. Cl.
    *H02K 15/03*        (2025.01)
    *H02K 15/12*        (2025.01)

(56)                      References Cited

FOREIGN PATENT DOCUMENTS

| DE | 112012000667 |      | 10/2013 |
|----|--------------|------|---------|
| DE | 102016210417 | A1   | 12/2016 |
| DE | 102016012742 | A1   | 4/2017  |
| DE | 102017214309 | A1   | 2/2019  |
| EP | 1793479      | A1   | 6/2007  |
| JP | 2008067474   | A    | 3/2008  |
| JP | 2010206944   | A    | 9/2010  |
| JP | 2011182552   | A    | 9/2011  |
| JP | 2015154686   | A    | 8/2015  |
| JP | 2015173545   | A    | 10/2015 |
| JP | 2019009866   | A    | 1/2019  |
| JP | 2019161945   | A    | 9/2019  |
| WO | 2007123057   | A1   | 11/2007 |
| WO | 2017159348   | A1   | 9/2017  |

OTHER PUBLICATIONS

European Patent Office, International Search Report received in International Application No. PCT/DE2022/100713, Jan. 5, 2023, 27 pages (including translation).

German Patent Office, Office Action received in German Application No. 102021126750.1, Jun. 10, 2022, 46 pages (including translation).

Schneider et al., "Highly Integrative and Flexible Electric Drive Unit for Electric Vehicles," German Automotive Magazine ATZ, vol. 113, May 2011, 12 pages (including translation).

* cited by examiner

ROTOR, METHOD FOR MANUFACTURING A ROTOR, AND ELECTRIC MACHINE

CROSS-REFERENCE TO RELATED APPLICATION

The present application is the U.S. National Phase of PCT Patent Application Number PCT/DE2022/100713, filed on Sep. 27, 2022, which claims priority to German Patent Application Number 10 2021 126 750.1, filed Oct. 15, 2021, the entire disclosures of which are incorporated by reference herein.

TECHNICAL FIELD

The present disclosure relates to a rotor for an electric machine, comprising a cylindrical rotor body formed from a laminated rotor core with a plurality of pockets for receiving rotor magnets, at least a first group of pockets extending in a substantially tangential direction, and the rotor magnets being fixed in the pockets of the first group by an injected plastic. The disclosure furthermore relates to a method for producing a rotor and to an electric machine.

BACKGROUND

Electric motors are increasingly being used to drive motor vehicles in order to create alternatives to internal combustion engines that require fossil fuels. Significant efforts have already been made to improve the suitability of electric drives for everyday use and also to be able to offer users the driving comfort they are accustomed to.

A detailed description of an electric drive can be found in an article in the German automotive magazine ATZ, volume 113, May 2011, pages 360-365 by Erik Schneider, Frank Fickl, Bernd Cebulski and Jens Liebold with the title: *Hochintegrativ und Flexibel Elektrische Antriebseinheit für E-Fahrzeuge* [Highly Integrative and Flexible Electric Drive Unit for E-Vehicles]. This article describes a drive unit for an axle of a vehicle, which comprises an electric motor that is arranged so as to be concentric and coaxial with a bevel gear differential, a shiftable 2-speed planetary gear set being arranged in the drive train between the electric motor and the bevel gear differential and likewise positioned to be coaxial with the electric motor and the bevel gear differential or spur gear differential. The drive unit is very compact and allows for a good compromise between climbing ability, acceleration and energy consumption due to the shiftable 2-speed planetary gear set. Such drive units are also referred to as e-axles or electrically operable drive trains.

In addition to purely electrically operated drive trains, hybrid drive trains are also known. Such drive trains of a hybrid vehicle usually comprise a combination of an internal combustion engine and an electric motor, and enable, for example in conurbations, a purely electric mode of operation while at the same time permitting both sufficient range and availability, in particular when driving cross-country. In addition, it is also possible to drive the internal combustion engine and the electric motor at the same time in certain operating situations.

During operation, electric machines are subject to losses due to magnetic reversal and eddy currents, which are grouped together as iron losses and reduce machine efficiency. In mobile applications, particularly when using electric machines within a drive train of a hybrid or fully electric motor vehicle, low efficiency of the electric machine means a shorter range of the vehicle or an increased need for battery capacity.

An example of such an electric machine, as can be used within a drive train of a hybrid or fully electric motor vehicle, is a "permanently excited" synchronous machine. Due to its high power density compared to other types of machines, it is preferred for use in the field of electromobility, where the available installation space is often a limiting factor. The excitation field of the machine is usually generated by permanent magnets that are arranged in the rotor of the machine. In a permanently excited synchronous machine, it is possible to dispense with a slipring contact which is necessary in electrically excited synchronous machines in order to supply power to an excitation coil arranged on the rotor.

When developing the electric machines intended for e-axles or hybrid modules, there is a continuing need to increase their power densities, with the maximally precise formation of the air gap between the rotor and the stator being an essential performance-determining variable. The noise generated by the drive and its weight play an important role, particularly in the case of hybrid or fully electric drive concepts. However, these two requirements run counter to each other, with better noise insulation of the drive usually also resulting in a higher weight. High electromagnetic excitation, which can also lead to acoustic vibrations in the structural components of the electric machine or drive train, can occur for system-related reasons during operation of such an electric machine for a hybrid or fully electric drive train. This can then also be audible in the interior of the vehicle, which is regularly perceived as intrusive.

SUMMARY

One object of the disclosure is therefore to provide a rotor for an electric machine that can provide improved power density and lower noise during operation. A further object of the disclosure is to provide an improved method for producing a rotor. A final object of the disclosure is also to provide an improved electric machine.

This object is achieved by a rotor for an electric machine comprising a cylindrical rotor body formed from a laminated rotor core with a plurality of pockets for receiving rotor magnets, at least a first group of pockets extending in a substantially tangential direction, and the rotor magnets being fixed in the pockets of the first group by an injected plastic, the pockets of the first group having a radially outer contour which substantially corresponds to the radially outer arcuate contour of the cylindrical rotor body in each case radially above the pockets of the first group, plastic being provided in each case between the radially outer contour of one of the pockets of the first group and the rotor magnet fixed in the pocket.

This achieves the advantage that the rotor has a very precise roundness on its radially outer lateral surface, which helps to provide a correspondingly precise and homogeneous air gap between the rotor and a stator. In this way, undesirable vibration and the associated noise can be reduced or even completely avoided.

The individual elements of the claimed subject matter of the disclosure will be explained first in the order in which they are named in the claims, after which particularly preferred embodiments of the subject matter of the disclosure will be described.

Electric machines are used to convert electrical energy into mechanical energy and/or vice versa, and generally comprise a stationary part referred to as a stator or stationary armature, and a part referred to as a rotor or moving armature and arranged movably relative to the stationary part.

The electric machine can in particular be designed as a rotary machine. The electric machine can be configured as a radial flux machine or an axial flux machine. A radial flux machine is characterized in that the magnetic field lines extend in the radial direction in the air gap formed between rotor and stator, while in the case of an axial flux machine the magnetic field lines extend in the axial direction in the air gap formed between rotor and stator. In the context of this disclosure, it is particularly preferred for the electric machine to be configured as a radial flow machine.

The gap between the rotor and the stator is referred to as the air gap. In a radial flux machine, this is an annular gap with a radial width that corresponds to the distance between the rotor body and the stator body.

The electric machine can preferably have a motor housing. The motor housing can enclose the electric machine. A motor housing can furthermore accommodate the control unit, in particular the control and power electronics. The motor housing can furthermore be part of a cooling system for the electric machine, and can be designed such that cooling fluid can be supplied to the electric machine via the motor housing and/or the heat can be dissipated to the outside via the housing surfaces. In addition, the motor housing protects the electric machine and any electronics that may be present from external influences.

A motor housing can be formed in particular from a metallic material. Advantageously, the motor housing can be formed from a cast metal material, such as gray cast iron or cast steel. In principle, it is also conceivable to form the motor housing entirely or partially from a plastic.

The rotor according to the disclosure can comprise a rotor body. A rotor body for the purposes of the disclosure is understood to mean the rotor without a rotor shaft. The rotor body is therefore composed in particular of the laminated rotor core and the magnetic elements introduced into the pockets of the laminated rotor core or fixed circumferentially to the laminated rotor core and any axial cover parts present for closing the pockets.

The permanent magnets to be introduced into the pockets of the laminated rotor core are understood as the rotor magnet. A single larger rotor magnet designed as a bar magnet or a plurality of smaller permanent magnetic elements can be provided for each pocket.

A laminated rotor core is understood to mean a plurality of laminated individual laminations or rotor laminations, which are generally made from electrical metal sheet and are stacked and packaged one on top of the other to form a stack or "laminated rotor core". The individual laminations can then remain held together in the laminated core by gluing, welding, or screwing.

A rotor lamination can have one or more cutouts, which can also be referred to as a recess or opening, the individual cutouts of the individual rotor laminations together forming a pocket provided in the axial direction in a rotor lamination stack for receiving magnetic elements.

The rotor preferably comprises a rotor shaft and one or more rotor bodies arranged in a non-rotatable manner on the rotor shaft. The rotor shaft can be hollow, which on the one hand results in weight savings and on the other hand allows the supply of lubricant or coolant to the rotor body.

The electric machine can furthermore have a control unit. A control unit, as used in the present disclosure, serves in particular in open- and/or closed-loop electronic control of one or more technical systems of a motor vehicle.

A control unit has, in particular, a wired or wireless signal input for receiving in particular electrical signals, such as sensor signals, for example. Furthermore, a control unit likewise preferably has a wired or wireless signal output for the transmission of, in particular, electrical signals, for example to electrical actuators or electrical consumers of the electrically operated axle drive train or of the motor vehicle.

Open-loop control operations and/or closed-loop control operations can be carried out within the control unit. It is very particularly preferred for the control unit to comprise hardware that is designed to run software. The control unit preferably comprises at least one electronic processor for executing program sequences defined in software.

The control unit can furthermore have one or more electronic memories in which the data contained in the signals transmitted to the control unit can be stored and read out again. Furthermore, the control unit can have one or more electronic memories in which data can be stored in a modifiable and/or non-modifiable manner.

A control unit can comprise a plurality of control devices which are arranged in particular spatially separate from one another in the motor vehicle. Control devices are also referred to as electronic control units (ECU) or electronic control modules (ECM) and preferably have electronic microcontrollers for carrying out computing operations for processing data, particularly preferably using software. The control devices can preferably be interconnected with one another such that wired and/or wireless data exchange between control devices is made possible. In particular, it is also possible to interconnect the control devices with one another via bus systems present in the motor vehicle, such as a CAN bus or LIN bus for example.

Very particularly preferably, the control unit has at least one processor and at least one memory, which in particular contains a computer program code, the memory and the computer program code being configured with the processor to cause the control unit to execute the computer program code.

The control unit can particularly preferably comprise a power electronics module for energizing the stator or rotor. A power electronics module is preferably a combination of different components that provide open- or closed-loop control of a current to the electric machine, preferably including the peripheral components required for this purpose, such as cooling elements or power supply units. In particular, the power electronics module contains one or more power electronics components that are configured to provide open- or closed-loop control of a current. These are particularly preferably one or more power switches, such as power transistors. The power electronics unit particularly preferably has more than two, particularly preferably three, phases or current paths which are separate from one another and each have at least one separate power electronics component. The power electronics unit is preferably designed to provide open- or closed-loop control of a power per phase with a peak power, preferably continuous power, of at least 10 W, preferably at least 100 W, particularly preferably at least 1000 W.

The electric machine is intended in particular for use within a drive train of a hybrid or fully electrically driven motor vehicle. In particular, the electric machine is dimensioned such that vehicle speeds of more than 50 km/h, preferably more than 80 km/h and in particular more than 100 km/h can be achieved. The electric motor particularly preferably has an output of more than 30 kW, preferably more than 50 KW and in particular more than 70 KW. Furthermore, it is preferred that the electric machine provides speeds greater than 5,000 rpm, particularly preferably greater than 10,000 rpm, very particularly preferably greater than 12,500 rpm.

The electric machine can be installed in an electrically operated axle drive train. An electric axle drive train of a motor vehicle comprises an electric machine and a transmission, the electric machine and the transmission forming a structural unit. Provision can in particular be made for the electric machine and the transmission to be arranged in a common drive train housing. Alternatively, it would of course also be possible for the electric machine to have a motor housing and the transmission to have a transmission housing, in which case the structural unit can then be effected by fixing the transmission in relation to the electric machine. This structural unit is sometimes also referred to as an e-axle.

The electric machine can in particular also be intended for use in a hybrid module. In a hybrid module, structural and functional elements of a hybridized drive train can be spatially and/or structurally combined and preconfigured such that a hybrid module can be integrated into a drive train of a motor vehicle in a particularly simple manner. In particular, an electric motor and a clutch system, in particular with a disconnect-type clutch for engaging the electric motor in and/or disengaging the electric motor from the drive train, can be present in a hybrid module.

According to one advantageous embodiment of the disclosure, it can be provided that a radially inner contour of the pockets has a substantially tangential, straight extension, whereby advantageous magnetic excitation can be generated.

According to a further preferred development of the disclosure, it can also be provided that the pockets of the first group have a rectangular basic shape. Furthermore, according to a likewise advantageous embodiment of the disclosure, it can be provided that the rotor magnet is designed as a bar magnet with a substantially rectangular cross-sectional contour, such that the rotor magnet can be inserted into the rectangular pocket in the axial direction in an easy-to-assemble manner.

According to a further particularly preferred embodiment of the disclosure, it can be provided that the first group of pockets is arranged on a pitch circle which corresponds to between 0.8 and 0.97 times the diameter of the cylindrical rotor body, which has also proven to be positive for magnetic excitation.

Furthermore, the disclosure can also be further developed such that the pockets of the first group each have an injection zone for the plastic at their tangential ends, which facilitates the corresponding defined fixation of the rotor magnets in the pockets.

The object of the disclosure is furthermore achieved by a method for producing a rotor for an electric machine comprising a substantially cylindrical rotor body formed from a laminated rotor core with a plurality of pockets for receiving rotor magnets, at least a first group of pockets being located in the substantially tangential direction, comprising the following steps:

providing the rotor body, the rotor body having an outer contour portion radially above the pockets of the first group, said contour portion having a contour that deviates from the arcuate contour of the cylindrical rotor body, inserting the rotor magnets into the first group of pockets, injecting a plastic into the first group of pockets such that the rotor magnets are fixed in the pockets of the first group, the injection pressure and temperature of the plastic during injection as well as the radially outer contour of the pockets of the first group and the outer contour portion before the plastic is injected being selected such that once the plastic has been injected, the outer contour portions have a contour due to material offset between the outer contour of the pockets and the outer contour portion which substantially corresponds to the arcuate contour of the cylindrical rotor body.

This can ensure that the radially outer lateral surface of the rotor has a very precise roundness and the fewest and smallest possible deviations from a circular shape.

It can also be advantageous to further develop the disclosure such that, before the plastic is injected, the outer contour portions are each a straight line running substantially parallel to the tangential extent of the pockets, this having proven to be particularly favorable in terms of production engineering.

The plastic can preferably be introduced into the pockets of the rotor body using a transfer molding process. The plastic is preferably injected into the pockets of the rotor body at pressures of 10-150 bar, in particular 20-100 bar. On injection into the pockets of the rotor body, the plastic particularly preferably has a temperature of between 12° and 250° C., preferably between 14° and 200° C. The flow rate of the plastic on injection into the pockets is preferably 0.5-20 mm/s, preferably 1-15 mm/s.

The object of the disclosure can also be achieved by an electrical metal sheet for forming a laminated rotor core of a rotor body of a rotor of an electric machine, the electrical metal sheet having a plurality of pockets for receiving rotor magnets, at least a first group of pockets extending in a substantially tangential direction, and the electrical metal sheet having an outer contour portion radially above the pockets of the first group, which contour portion has a contour that deviates from the arcuate contour of the circular outer contour of the electrical metal sheet and is offset radially inward. Such an electrical metal sheet is intended in particular for use in a method according to claim 7.

The object of the disclosure is also achieved by an electric machine, in particular for a drive train of a hybrid or fully electric motor vehicle, comprising a rotor according to one of claims 1-6.

The disclosure is explained in more detail below with reference to drawings without limiting the general concept of the disclosure.

DETAILED DESCRIPTION

Figure 1:
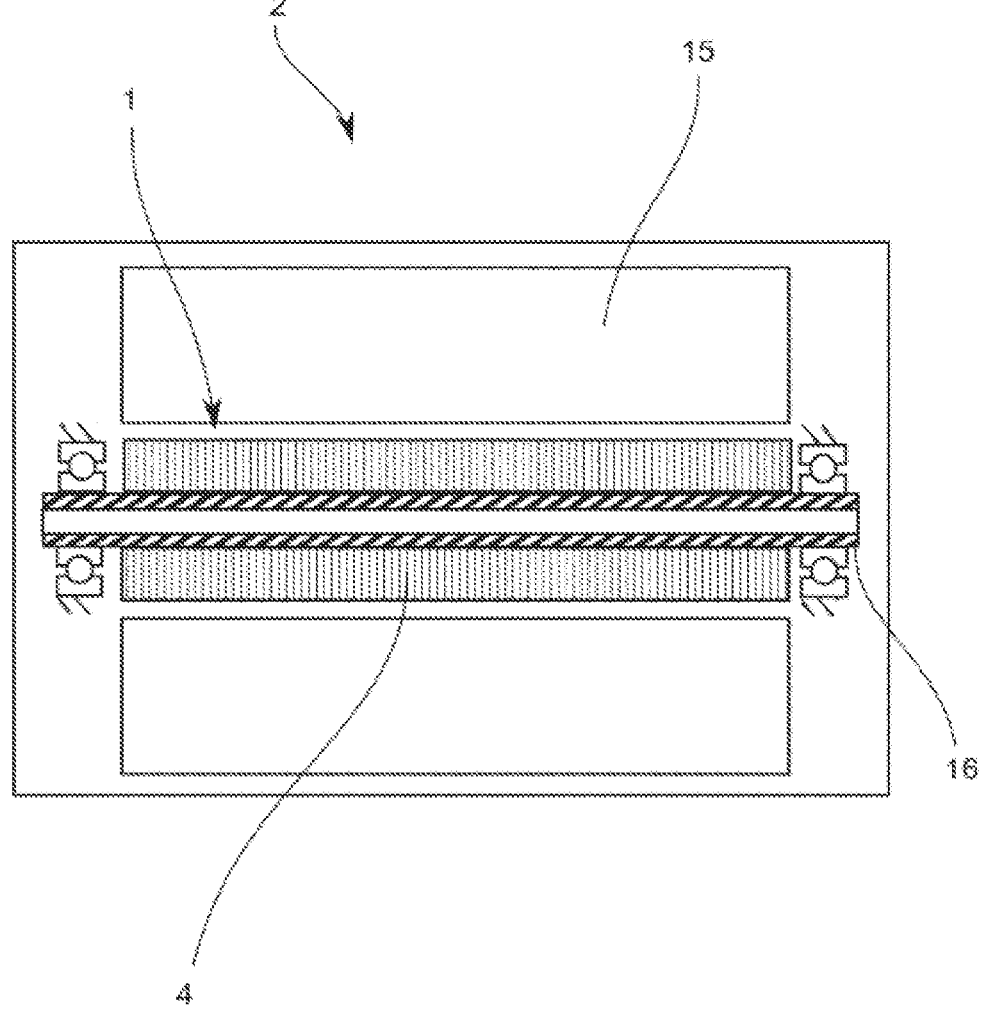
FIG. 1 shows an electrical radial flux machine in a schematic axial sectional view.

FIG. 1 shows an electric machine 2, in particular for a drive train of a hybrid or fully electrically operated motor vehicle, comprising a rotor 1 which is rotatably mounted relative to a stator 15. The electric machine 2 is designed as a radial flux machine, in which the stator 15 is constructed like a cylindrical ring and the rotor 1 is arranged coaxially within the stator 15. The rotor 1 furthermore has a rotor shaft 16 on which the rotor body 4 is arranged.

Figure 2:
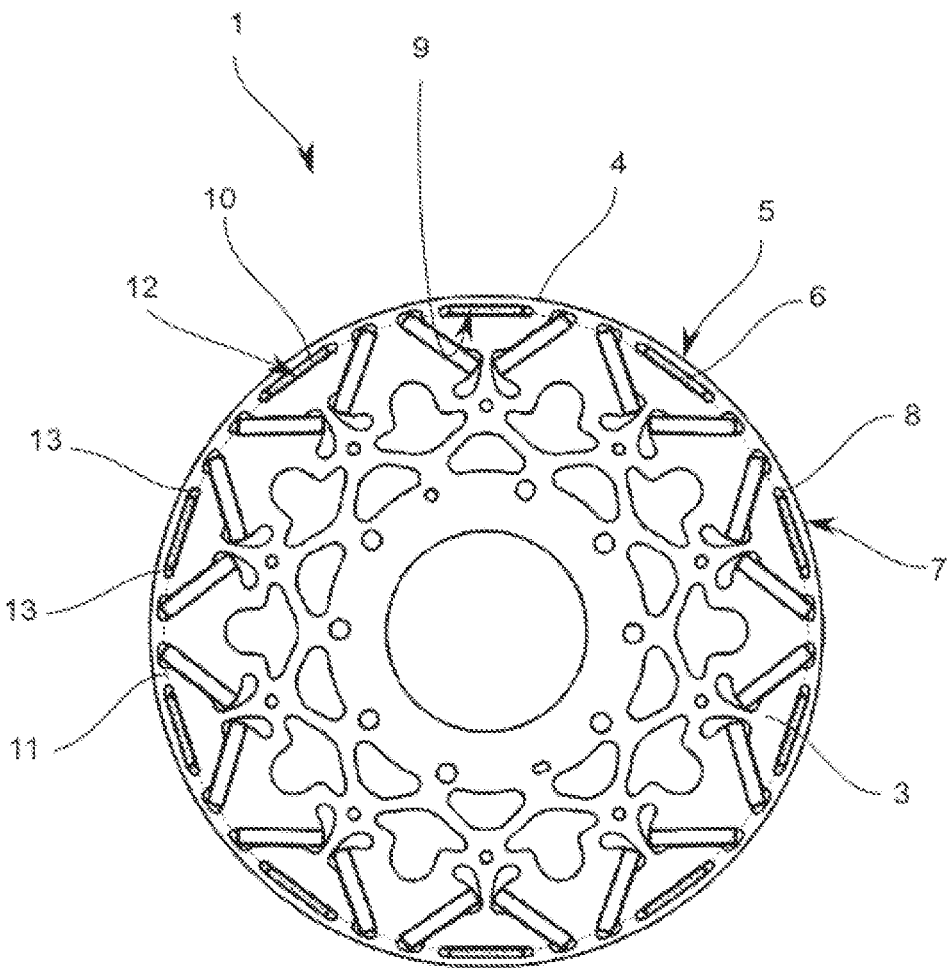
FIG. 2 shows a rotor of a radial flow machine in a cross-sectional representation.

FIG. 2 shows the assembly known from FIG. 1 in a cross-sectional view. The rotor comprises a cylindrical rotor body 4 formed from a laminated rotor core 3 with a plurality of pockets 5 for receiving rotor magnets 6. A first group 7 of substantially identically shaped pockets 5 arranged equidistantly over the circumference of the rotor 1 extend in a substantially tangential direction. The pockets 5 of the first group 7 have a rectangular basic shape. The rotor magnets 6 are each designed as a bar magnet with a substantially rectangular cross-sectional contour 10.

The rotor magnets 6 can be inserted with play into the pockets 5 from the axial direction, but are fixed in the pockets 5 of the first group 7 by an injected plastic 8. The pockets 5 of the first group 7 have a radially outer contour 9, which substantially corresponds to the radially outer arcuate contour of the cylindrical rotor body 4 in each case radially above the pockets 5 of the first group 7, as is also readily apparent from the detail view of FIG. 4. In contrast to the radially outer contour 9, the radially inner contour 12 of the pockets 5 has a substantially tangential, straight extension. The pockets 5 of the first group 7 each have at their tangential ends an injection zone 13 for the plastic 8.

In the space formed by the play between the rotor magnets 6 and the pockets 5, injected plastic 8 is located between the radially outer contour 9 and a rotor magnet 6. In other words, plastic 8 is present between the radially outer contour 9 of one of the pockets 5 of the first group 7 and the rotor magnet 6 fixed in the pocket 5, whereby the corresponding rotor magnet 6 is also fixed in the pocket 5 completely without any radial play. The rotor magnet 6 is also held on the radially inner contour 12 of the pocket 5 by the injected plastic 8.

In the embodiments of the rotor 1 shown in FIGS. 2-4, there is a second, V-shaped group 14 of pockets 5 equipped with rotor magnets 6 radially below each of the pockets 5 of the first group 7. A V-shaped group 14 of pockets 5 is formed by two rectangular pockets 5 that are separated from one another and have a V-shaped positioning relative to one another, as is readily apparent from FIGS. 2-4. The vertex of the V-shaped arrangement of the pockets 5 of group 14 points radially inward. The number of pockets 5 in group 14 is therefore twice the number of pockets 5 in the first group 7.

FIG. 2 further shows that the first group 7 of pockets 5 is arranged on a pitch circle 11 which corresponds to between 0.8 and 0.97 times the diameter of the cylindrical rotor body 4.

A method for producing a rotor 1 for an electric machine 2, as is known from FIG. 2, is explained in more detail below with reference to FIGS. 2-3.

Figure 3:
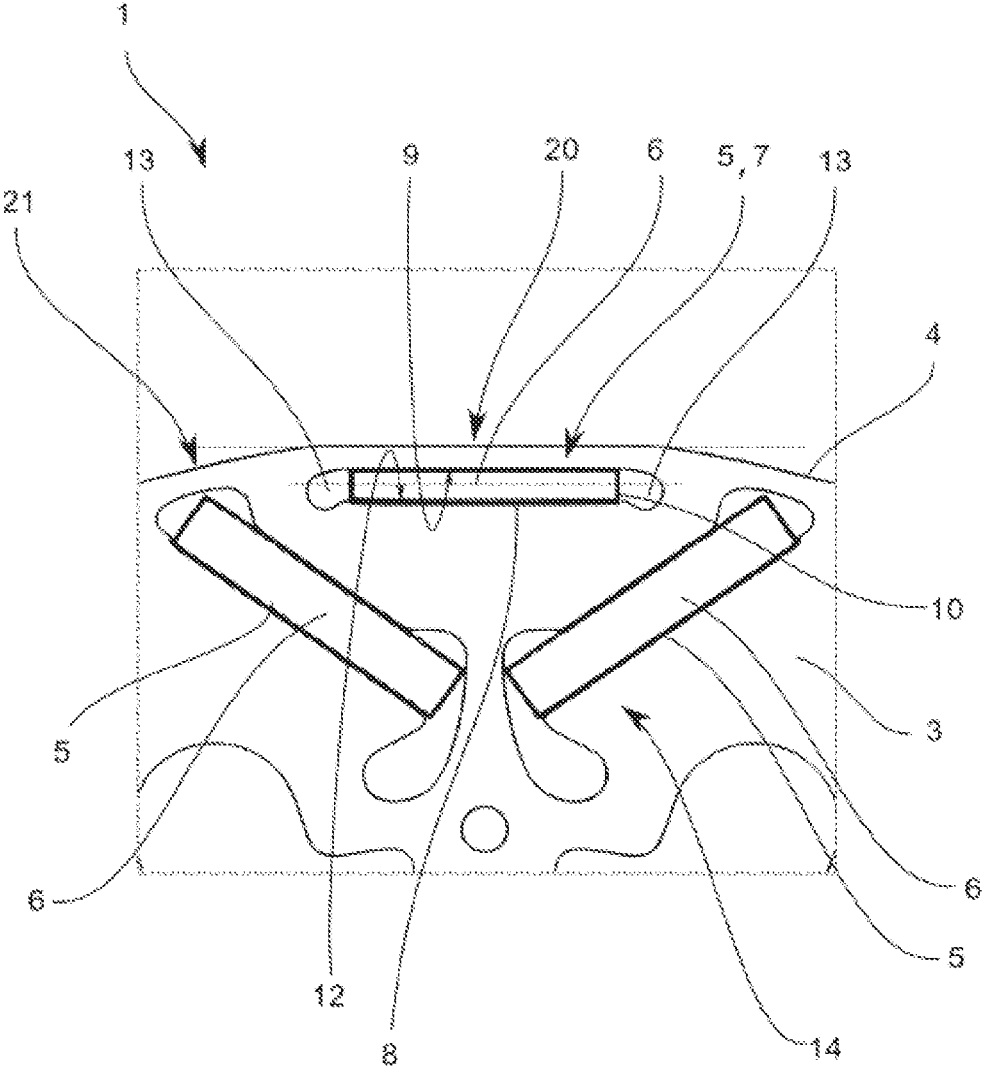
FIG. 3 shows a detail view of a pocket of a rotor in a first manufacturing step in a schematic cross-sectional representation.
Figure 4:
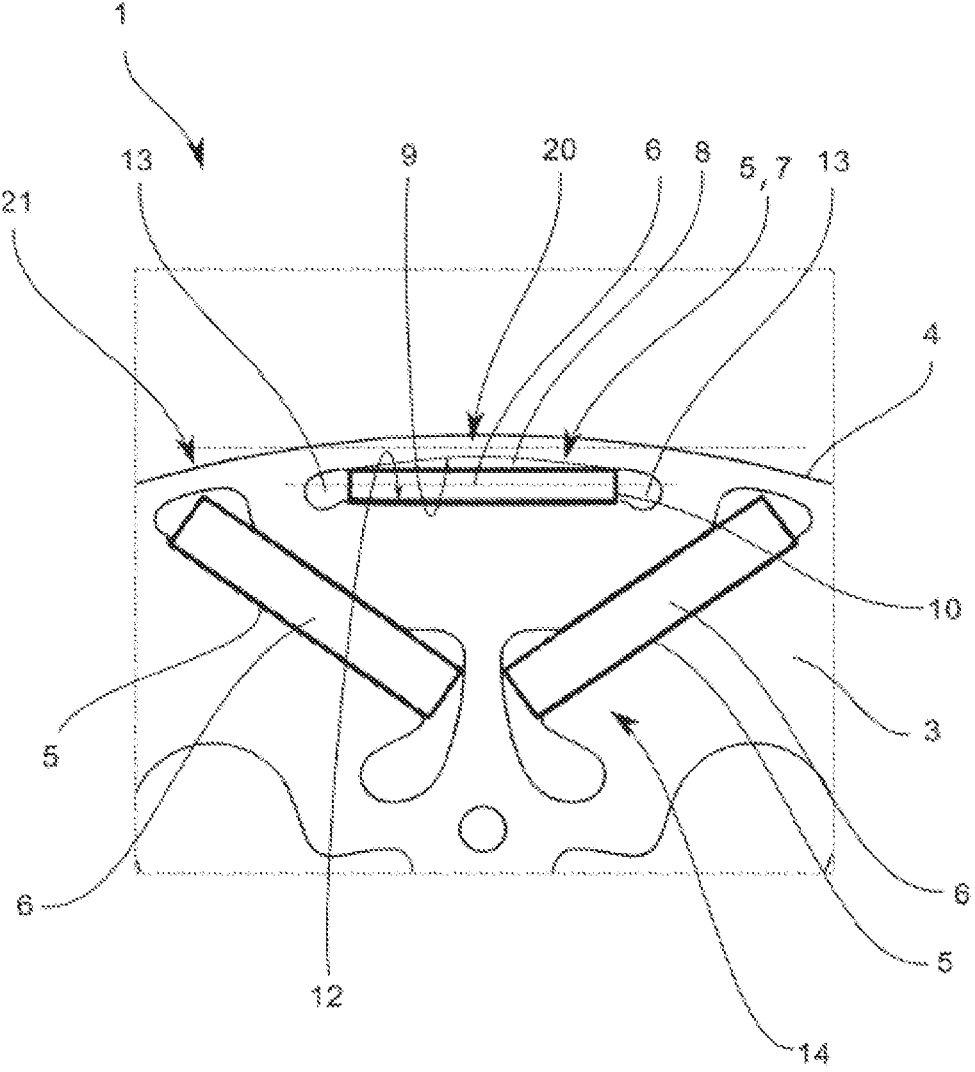
FIG. 4 shows a detail view of a pocket of a rotor in a second manufacturing step in a schematic cross-sectional representation.

First, the rotor body 4 is provided, with the rotor body 4 in each case having an outer contour portion 20 radially above the pockets 5 of the first group 7, which has a contour that deviates from the arcuate contour 21 of the cylindrical rotor body 4, as is readily apparent from FIG. 3. Before the plastic 8 is injected, these outer contour portions 20 are each formed as a straight line running substantially parallel to the tangential extent of the pockets 5. The contour portions 20 can be formed, for example, by punching or milling.

The rotor magnets 6 can then be inserted with play into the first group 7 of pockets 5. In this production state, a plastic 8 is then injected via the injection zones 13 into the first group 7 of pockets 5, such that the rotor magnets 6 are fixed in the pockets 5 of the first group 7.

The injection pressure and the temperature of the plastic 8 during injection as well as the radially outer contour 9 of the pockets 5 of the first group 7 and the outer contour portion 20 before the plastic 8 is injected are selected such that, once the plastic 8 has been injected, the outer contour portions 20 have a contour due to material offset between the outer contour 9 of the pockets 5 and the outer contour portion 20 which substantially corresponds to the arcuate contour 21 of the cylindrical rotor body 4. In other words, the straight contour portion 20 is displaced radially outward by the injection pressure of the plastic 8 into the pockets 5, such that a bulge is generated in the contour portion 20, which bulge corresponds to the arcuate contour 21 of the rotor body 4, as is readily apparent in FIG. 4.

The plastic 8 was in this case injected into the pockets 5 of the first group 7 of the rotor body 4 by a transfer molding process at an injection pressure of 20-100 bar and a temperature of the plastic 8 on injection of between 140 and 200° C. The flow speed of the plastic 8 on injection into the pockets 5 is preferably 1-15 mm/s.

FIG. 3 showed a top view of an electrical metal sheet of the laminated rotor core 3 of the rotor body 4, as used in the production method outlined above. The electrical metal sheet has a plurality of pockets 5 for receiving rotor magnets 6, with at least a first group 7 of pockets 5 extending in a substantially tangential direction, and the electrical metal sheet has an outer contour portion 20 radially above the pockets 5 of the first group 7, which contour portion has a contour that deviates from the arcuate contour 21 of the circular outer contour of the electrical metal sheet and is offset radially inward. In the exemplary embodiment shown, the contour deviating from the circular outer contour of the electrical metal sheet is designed as a tangential straight-line portion that runs parallel to the inner contour 12 of the pocket 5. In the exemplary embodiment shown, the tangential straight portion extends in the circumferential direction completely over the entire longitudinal extent of the pocket 5.

The disclosure is not limited to the embodiments shown in the figures. The above description is therefore not to be regarded as limiting, but rather as illustrative. The following claims are to be understood as meaning that a stated feature is present in at least one embodiment of the disclosure. This does not exclude the presence of further features. Where the claims and the above description define 'first' and 'second' features, this designation serves to distinguish between two features of the same type without defining an order of precedence.

LIST OF REFERENCE SYMBOLS

1 Rotor
2 Electric machine
3 Laminated rotor core
4 Rotor body
5 Pockets
6 Rotor magnets
7 Group
8 Plastic
9 Contour
10 Cross-sectional contour
11 Pitch circle
12 Contour
13 Injection zone

14 Group
15 Stator
16 Rotor shaft
20 Contour portion
21 Contour

The invention claimed is:

1. A rotor for an electric machine comprising a cylindrical rotor body formed from a laminated rotor core with a plurality of pockets for receiving rotor magnets, at least a first group extending from pockets in a substantially tangential direction, and the rotor magnets being fixed in the pockets of the first group by an injected plastic, characterized in that the pockets of the first group have a radially outer contour which substantially corresponds to the radially outer arcuate contour of the cylindrical rotor body in each case radially above the pockets of the first group, plastic being provided between the radially outer contour of one of the pockets of the first group and the rotor magnet fixed in the pocket.

2. The rotor according to claim 1, wherein a radially inner contour of the pockets has a substantially tangential, straight extension.

3. The rotor according to claim 1, wherein the pockets of the first group have a rectangular basic shape.

4. The rotor according to claim 1, wherein the rotor magnet is designed as a bar magnet with a substantially rectangular cross-sectional contour.

5. The rotor according to claim 1, wherein the first group of pockets is arranged on a pitch circle which corresponds to between 0.8 and 0.97 times the diameter of the cylindrical rotor body.

6. The rotor according to claim 1, wherein the pockets of the first group each have at their tangential ends an injection zone for the plastic.

7. A method for producing a rotor for an electric machine comprising a substantially cylindrical rotor body formed from a laminated rotor core with a plurality of pockets for receiving rotor magnets, at least a first group of pockets extending in a substantially tangential direction, the method comprising the following steps:

providing the rotor body, the rotor body having an outer contour portion radially above the pockets of the first group, said contour portion having a contour that deviates from the arcuate contour of the cylindrical rotor body, inserting the rotor magnets into the first group of pockets, injecting a plastic into the first group of pockets such that the rotor magnets are fixed in the pockets of the first group, the injection pressure and temperature of the plastic during injection as well as the radially outer contour of the pockets of the first group and the outer contour portion before the plastic is injected being selected such that once the plastic has been injected, the outer contour portions have a contour due to material offset between the outer contour of the pockets and the outer contour portion which substantially corresponds to the arcuate contour of the cylindrical rotor body.

8. The method according to claim 7, wherein, before the plastic is injected, the outer contour portions are each a straight line running substantially parallel to the tangential extent of the pockets.

9. An electrical metal sheet for forming a laminated rotor core of a rotor body of a rotor of an electric machine, wherein the electrical metal sheet has a plurality of pockets for receiving rotor magnets, at least a first group of pockets extending in a substantially tangential direction, and the electrical metal sheet having an outer contour portion radially above the pockets of the first group, which contour portion has a contour that deviates from the arcuate contour of the circular outer contour of the electrical metal sheet and is offset radially inward.

10. An electric machine for a drive train of a hybrid or fully electric motor vehicle, comprising a rotor according to claim 1.

11. The electrical metal sheet of claim 9, wherein a radially inner contour of the pockets comprises a substantially tangential, straight extension.

12. The electrical metal sheet of claim 9, wherein the pockets of the first group have a rectangular shape.

13. The electrical metal sheet of claim 9, wherein the rotor magnet comprises a bar magnet with a substantially rectangular cross-sectional contour.

14. The electrical metal sheet of claim 9, wherein the first group of pockets is arranged on a pitch circle corresponding to between 0.8 and 0.97 times the diameter of the cylindrical rotor body.

15. The electrical metal sheet of claim 9, wherein the pockets of the first group each have at a tangential end an injection zone for the plastic.

16. The method of claim 7, wherein a radially inner contour of the pockets comprises a substantially tangential, straight extension.

17. The method of claim 7, wherein the pockets of the first group have a rectangular shape.

18. The method of claim 7, wherein the rotor magnet comprises a bar magnet with a substantially rectangular cross-sectional contour.

19. The method of claim 7, wherein the first group of pockets is arranged on a pitch circle corresponding to between 0.8 and 0.97 times the diameter of the cylindrical rotor body.

20. The method of claim 7, wherein the pockets of the first group each have at a tangential end an injection zone for the plastic.

* * * * *